US010275463B2

(12) United States Patent
Isquith et al.

(10) Patent No.: US 10,275,463 B2
(45) Date of Patent: Apr. 30, 2019

(54) SYSTEM AND METHOD FOR SCORING AND RANKING DIGITAL CONTENT BASED ON ACTIVITY OF NETWORK USERS

(71) Applicant: Slacker, Inc., San Diego, CA (US)

(72) Inventors: Jack Isquith, La Crescenta, CA (US); Jordan Michael Green, Escondido, CA (US); Nallan Chakravarthi Suresh, Fremont, CA (US); James A. Cady, Beaverton, OR (US); Scott Philip Riggs, San Diego, CA (US)

(73) Assignee: SLACKER, INC., San Diego, CA (US)

( * ) Notice: Subject to any disclaimer, the term of this patent is extended or adjusted under 35 U.S.C. 154(b) by 153 days.

(21) Appl. No.: 14/216,877

(22) Filed: Mar. 17, 2014

(65) Prior Publication Data

US 2015/0006544 A1     Jan. 1, 2015

Related U.S. Application Data

(60) Provisional application No. 61/792,191, filed on Mar. 15, 2013.

(51) Int. Cl.
G06F 17/30        (2006.01)

(52) U.S. Cl.
CPC ............... *G06F 17/30029* (2013.01)

(58) Field of Classification Search
CPC ................................. G06F 17/30029
USPC ......................................... 707/748
See application file for complete search history.

(56) References Cited

U.S. PATENT DOCUMENTS

| 4,881,078 A | 11/1989 | Yamane et al. |
| 4,914,448 A | 4/1990 | Otsuka et al. |
| 5,038,211 A | 8/1991 | Hallenbeck |
| 5,117,407 A | 5/1992 | Vogel |
| 5,311,175 A | 5/1994 | Waldman |

(Continued)

FOREIGN PATENT DOCUMENTS

| EP | 0406845 B1 | 1/1994 |
| EP | 1610145 A1 | 12/2005 |

(Continued)

OTHER PUBLICATIONS

Carlvik, O. et al., "IP-Based Personalized Media on Demand," ISS '97, World Telecommunications Congress, (International Switching Symposium); Global Network Evolution: Convergence or Collision? Toronto, Sep. 21-26, 1997, pp. 365-370.

(Continued)

*Primary Examiner* — Hicham Skhoun
(74) *Attorney, Agent, or Firm* — Cooley LLP

(57) ABSTRACT

Systems and methods for delivering personalized content streams over a variety of devices and networks are disclosed. A user's preferences, customizations, and content are made available to the user through specialized clients for home, car, office, and portable environments. In order to enable personalized content streams on devices that are intermittently connected or that make use of network bandwidth during off-peak hours, the system prescribes a distributed content sequencing engine and a distributed, synchronized user profile and station/channel definitions. The system is also designed to support players connected via unidirectional or asymmetric connections such as satellite radios with or without an upstream data link.

11 Claims, 7 Drawing Sheets

(56) References Cited

U.S. PATENT DOCUMENTS

| | | | |
|---|---|---|---|
| 5,323,267 A | 6/1994 | Galarneau et al. | |
| 5,666,113 A | 9/1997 | Logan | |
| 5,923,267 A | 7/1999 | Beuk et al. | |
| 5,977,964 A | 11/1999 | Williams et al. | |
| 6,004,135 A | 12/1999 | Trattner et al. | |
| 6,023,242 A | 2/2000 | Dixon | |
| 6,049,306 A | 4/2000 | Amarillas | |
| 6,317,784 B1 | 11/2001 | MacKintosh et al. | |
| 6,349,339 B1 | 2/2002 | Williams et al. | |
| 6,351,596 B1 | 2/2002 | Ostrover | |
| 6,388,345 B1 | 5/2002 | Stimpson | |
| 6,389,321 B2 | 5/2002 | Tang et al. | |
| 6,437,774 B1 | 8/2002 | Tsuji et al. | |
| 6,553,222 B1 | 4/2003 | Weiss | |
| 6,563,805 B1 | 5/2003 | Ma et al. | |
| 6,564,003 B2 | 5/2003 | Marko et al. | |
| 6,587,127 B1 | 7/2003 | Leeke et al. | |
| 6,658,062 B1 | 12/2003 | Nakatsuyama | |
| 6,680,677 B1 | 1/2004 | Tiphane | |
| 6,778,841 B1 | 8/2004 | Bories et al. | |
| 6,785,656 B2 | 8/2004 | Patsiokas et al. | |
| 6,795,702 B2 | 9/2004 | Sennett | |
| 6,822,635 B2 | 11/2004 | Shahoian et al. | |
| 6,834,156 B1 | 12/2004 | Marko et al. | |
| 6,876,835 B1 | 4/2005 | Marko et al. | |
| 6,904,055 B2 | 6/2005 | Pichna et al. | |
| 6,933,433 B1 | 8/2005 | Porteus et al. | |
| 6,934,917 B2 | 8/2005 | Lin | |
| 6,972,363 B2 | 12/2005 | Georges et al. | |
| 6,985,694 B1 | 1/2006 | De Bonet et al. | |
| 7,010,263 B1 | 3/2006 | Patsiokas et al. | |
| 7,028,082 B1 | 4/2006 | Rosenberg et al. | |
| 7,035,932 B1 | 4/2006 | Dowling | |
| 7,057,521 B1 | 6/2006 | Beuk et al. | |
| 7,106,221 B2 | 11/2006 | Horton et al. | |
| 7,232,973 B2 | 1/2007 | Kaps et al. | |
| 7,187,947 B1 | 3/2007 | White et al. | |
| 7,216,008 B2 | 5/2007 | Sakata | |
| 7,251,452 B2 | 7/2007 | Stumphauzer, II | |
| 7,293,066 B1 | 11/2007 | Day | |
| 7,352,331 B2 | 4/2008 | Quagliaro | |
| 7,403,910 B1 | 7/2008 | Hastings et al. | |
| 7,526,728 B2 | 4/2009 | Apparao et al. | |
| 7,555,539 B1 | 6/2009 | Rosenberg et al. | |
| 7,483,964 B1 | 10/2009 | Jackson et al. | |
| 7,624,337 B2 | 11/2009 | Sull et al. | |
| 7,680,959 B2 | 3/2010 | Svendsen | |
| 7,756,388 B2 | 7/2010 | Plastina et al. | |
| 7,840,563 B2* | 11/2010 | Powers | G06F 17/30817 707/736 |
| 7,877,290 B1 | 1/2011 | Arsenault et al. | |
| 7,884,274 B1 | 2/2011 | Wieder | |
| 7,890,874 B2 | 2/2011 | Kaufman | |
| 7,953,032 B2 | 5/2011 | Liang | |
| 8,050,652 B2 | 11/2011 | Qureshey et al. | |
| 8,204,073 B1 | 6/2012 | Gailloux et al. | |
| 8,332,512 B1* | 12/2012 | Wu | G06Q 30/0254 705/319 |
| 8,370,351 B2* | 2/2013 | Kalasapur | G06F 17/30749 707/733 |
| 8,443,007 B1 | 5/2013 | Kindig et al. | |
| 8,712,563 B2 | 4/2014 | Milbrandt et al. | |
| 8,737,910 B2 | 5/2014 | Zigler et al. | |
| 8,838,564 B2* | 9/2014 | Sahni | H04L 67/22 707/706 |
| 8,849,820 B1 | 9/2014 | Kindig et al. | |
| 8,881,209 B2 | 11/2014 | Kalmes et al. | |
| 2001/0005900 A1 | 6/2001 | Yoshida et al. | |
| 2001/0053944 A1 | 12/2001 | Marks et al. | |
| 2002/0016643 A1 | 2/2002 | Sakata | |
| 2002/0041692 A1 | 4/2002 | Seto et al. | |
| 2002/0072341 A1 | 6/2002 | Ricard et al. | |
| 2002/0073225 A1 | 6/2002 | Dillon et al. | |
| 2002/0082901 A1 | 6/2002 | Dunning et al. | |
| 2002/0092019 A1 | 7/2002 | Marcus | |
| 2002/0158838 A1 | 10/2002 | Smith et al. | |
| 2002/0164973 A1 | 11/2002 | Janik et al. | |
| 2002/0184111 A1 | 12/2002 | Swanson | |
| 2002/0199194 A1 | 12/2002 | Ali | |
| 2003/0006690 A1 | 1/2003 | Roh | |
| 2003/0006892 A1 | 1/2003 | Church | |
| 2003/0014496 A1 | 1/2003 | Spencer et al. | |
| 2003/0027523 A1 | 2/2003 | Lim | |
| 2003/0050997 A1 | 3/2003 | Hickey et al. | |
| 2003/0052913 A1 | 3/2003 | Barile | |
| 2003/0061611 A1 | 3/2003 | Pendakur | |
| 2003/0066090 A1 | 4/2003 | Traw et al. | |
| 2003/0073411 A1 | 4/2003 | Meade | |
| 2003/0089218 A1 | 5/2003 | Gang et al. | |
| 2003/0110503 A1 | 6/2003 | Perkes | |
| 2003/0122779 A1 | 7/2003 | Martin et al. | |
| 2003/0182255 A1 | 9/2003 | Plastina et al. | |
| 2004/0001690 A1 | 1/2004 | Boston et al. | |
| 2004/0017316 A1 | 1/2004 | Tanaka et al. | |
| 2004/0044677 A1 | 3/2004 | Huper-Graff et al. | |
| 2004/0064476 A1 | 4/2004 | Rounds | |
| 2004/0158860 A1 | 8/2004 | Crow | |
| 2004/0218067 A1 | 11/2004 | Chen et al. | |
| 2004/0220926 A1 | 11/2004 | Lamkin et al. | |
| 2004/0267503 A1 | 12/2004 | Batterberry et al. | |
| 2005/0108754 A1 | 5/2005 | Carhart et al. | |
| 2005/0114794 A1 | 5/2005 | Grimes et al. | |
| 2005/0120305 A1 | 6/2005 | Engstrom et al. | |
| 2005/0172318 A1 | 8/2005 | Dudkiewicz et al. | |
| 2005/0179668 A1 | 8/2005 | Edwards | |
| 2005/0198690 A1 | 9/2005 | Esolen et al. | |
| 2005/0240661 A1 | 10/2005 | Heller et al. | |
| 2006/0005148 A1 | 1/2006 | Cheng et al. | |
| 2006/0009199 A1 | 1/2006 | Mittal | |
| 2006/0123053 A1 | 1/2006 | Scannell | |
| 2006/0022960 A1 | 2/2006 | Fukushima | |
| 2006/0026663 A1* | 2/2006 | Kortum | H04N 7/17318 725/134 |
| 2006/0031892 A1 | 2/2006 | Cohen | |
| 2006/0075007 A1 | 4/2006 | Anderson et al. | |
| 2006/0085349 A1 | 4/2006 | Hug | |
| 2006/0112082 A1 | 5/2006 | Platt et al. | |
| 2006/0126750 A1 | 6/2006 | Friedman | |
| 2006/0143094 A1 | 6/2006 | Kohout et al. | |
| 2006/0149813 A1 | 7/2006 | Janik | |
| 2006/0156236 A1 | 7/2006 | Heller et al. | |
| 2006/0174313 A1 | 8/2006 | Ducheneaut et al. | |
| 2006/0194535 A1 | 8/2006 | Houldsworth et al. | |
| 2006/0195516 A1 | 8/2006 | Beaupre | |
| 2006/0195790 A1 | 8/2006 | Beaupre et al. | |
| 2006/0200599 A1 | 9/2006 | Manchester et al. | |
| 2006/0206478 A1 | 9/2006 | Glaser et al. | |
| 2006/0206493 A1 | 9/2006 | Lipscomb et al. | |
| 2006/0212442 A1 | 9/2006 | Conrad et al. | |
| 2006/0212444 A1 | 9/2006 | Handman et al. | |
| 2006/0218187 A1 | 9/2006 | Plastina et al. | |
| 2006/0227905 A1 | 10/2006 | Kunysz et al. | |
| 2006/0235864 A1 | 10/2006 | Hotelling et al. | |
| 2006/0238517 A1 | 10/2006 | King et al. | |
| 2006/0239131 A1 | 10/2006 | Nathan et al. | |
| 2006/0253782 A1 | 11/2006 | Stark et al. | |
| 2006/0265329 A1 | 11/2006 | Hug | |
| 2006/0265421 A1 | 11/2006 | Ranasinghe et al. | |
| 2007/0013593 A1 | 1/2007 | Zafar et al. | |
| 2007/0041350 A1 | 2/2007 | Famolari | |
| 2007/0073728 A1 | 3/2007 | Klein, Jr. et al. | |
| 2007/0078899 A1 | 4/2007 | Gulin et al. | |
| 2007/0079352 A1 | 4/2007 | Klein, Jr. | |
| 2007/0089057 A1 | 4/2007 | Kindig | |
| 2007/0089132 A1 | 4/2007 | Qureshey et al. | |
| 2007/0136753 A1 | 6/2007 | Bovenschulte et al. | |
| 2007/0152975 A1 | 7/2007 | Ogihara et al. | |
| 2007/0152977 A1 | 7/2007 | Ng et al. | |
| 2007/0156589 A1 | 7/2007 | Zimler et al. | |
| 2007/0174147 A1 | 7/2007 | Klein, Jr. | |
| 2007/0208610 A1* | 9/2007 | Pisaris-Henderson | G06F 17/30899 705/14.1 |
| 2007/0220552 A1 | 9/2007 | Juster et al. | |

(56) References Cited

U.S. PATENT DOCUMENTS

| | | | |
|---|---|---|---|
| 2007/0236472 A1 | 10/2007 | Bentsen et al. | |
| 2007/0239856 A1 | 10/2007 | Abadir | |
| 2007/0281704 A1 | 12/2007 | Lin et al. | |
| 2007/0300158 A1 | 12/2007 | Kasperkiewicz et al. | |
| 2008/0009268 A1 | 1/2008 | Ramer et al. | |
| 2008/0024958 A1 | 1/2008 | Mudd et al. | |
| 2008/0052630 A1 | 2/2008 | Rosenbaum et al. | |
| 2008/0086379 A1 | 4/2008 | Dion et al. | |
| 2008/0097967 A1 | 4/2008 | Milbrandt et al. | |
| 2008/0120648 A1 | 5/2008 | Carlson et al. | |
| 2008/0162570 A1 | 7/2008 | Kindig et al. | |
| 2008/0215645 A1 | 9/2008 | Kindig et al. | |
| 2008/0222546 A1 | 9/2008 | Mudd et al. | |
| 2008/0222576 A1 | 9/2008 | Hashimoto | |
| 2008/0242277 A1 | 10/2008 | Chen et al. | |
| 2008/0258986 A1 | 10/2008 | Milbrandt et al. | |
| 2008/0261512 A1 | 10/2008 | Milbrandt et al. | |
| 2008/0263098 A1 | 10/2008 | Kindig et al. | |
| 2008/0305736 A1 | 12/2008 | Milbrandt et al. | |
| 2009/0017866 A1 | 1/2009 | White et al. | |
| 2009/0019374 A1 | 1/2009 | Logan et al. | |
| 2009/0031007 A1 | 1/2009 | Boic et al. | |
| 2009/0147975 A1 | 6/2009 | Horbach et al. | |
| 2009/0164419 A1* | 6/2009 | Taylor | G06Q 30/02 |
| 2010/0010648 A1 | 1/2010 | Bull et al. | |
| 2010/0106852 A1 | 4/2010 | Kindig et al. | |
| 2010/0121857 A1 | 5/2010 | Elmore et al. | |
| 2010/0125507 A1 | 5/2010 | Tarantino et al. | |
| 2011/0107381 A1 | 5/2011 | Solnik et al. | |
| 2013/0014136 A1 | 1/2013 | Bhatia et al. | |
| 2013/0086078 A1 | 4/2013 | Masseshaiah | |
| 2013/0218942 A1 | 8/2013 | Willis et al. | |
| 2013/0262966 A1* | 10/2013 | Wu | G06F 17/30867 715/202 |
| 2013/0318080 A1* | 11/2013 | Aravamudan | G06F 17/30035 707/734 |
| 2014/0006556 A1 | 1/2014 | Shapiro et al. | |
| 2014/0177717 A1 | 6/2014 | Li et al. | |
| 2014/0258025 A1* | 9/2014 | Bouzid | H04L 67/327 705/26.7 |
| 2014/0258313 A1* | 9/2014 | McCallum | G06F 17/30749 707/751 |
| 2014/0280213 A1 | 9/2014 | Isquith et al. | |
| 2016/0335258 A1 | 11/2016 | Kindig et al. | |
| 2017/0126770 A1 | 5/2017 | Kindig | |
| 2017/0195728 A1 | 7/2017 | Mudd et al. | |

FOREIGN PATENT DOCUMENTS

| | | |
|---|---|---|
| GB | 2343053 A | 4/2000 |
| KR | 10-2011-0073484 A | 6/2011 |
| WO | WO 1999/012230 | 3/1999 |
| WO | WO 2001/035667 | 5/2001 |
| WO | WO 2004/097803 | 11/2004 |
| WO | WO 2005/034407 | 4/2005 |
| WO | WO 2005/076117 | 8/2005 |
| WO | WO 2006/042309 | 4/2006 |
| WO | WO 2006/124277 | 11/2006 |
| WO | WO 2008/060032 | 5/2008 |

OTHER PUBLICATIONS

Hacker, S., "MP3: the Definitive Guide," Mar. 1, 2000, O'Reilly Media, Inc., p. 112, ISBN: 978-1-565-92661-5.
Motorola, "Complexity analysis of the Motorola Turbo Code Interleaver," TSG-RAN Working Group 1 Meeting #3, Eskilstuna, Sweden, Mar. 22-26, 1999, pp. 1-5.
Tell, E. et al., "A hardware architecture for a multi mode block interleaver," Proc. ICCSC [Online], Jul. 2004, Moscow Russia, Retrieved from the Internet: <Url: http://www.da.isy.liu.se/pubs/erite/>, [Retrieved on Aug, 14, 2008], pp. 1-4.
Wikipedia, "Pandora Radio," Oct. 7, 2006, (online), Retrieved from the Internet on: Oct. 12, 2010, <Url: http://en.wikipedia.org/w/index.php?title=Pandora_Radio&oldid=80072157>, 3 pages.
Pandora, "Frequently Asked Questions", Aug. 30, 2006, Pandora Media Inc., Retrieved from the Internet: <Url: web.archive.org/web/20060830160154/http://blog.pandora.com/faq/>, pp. 1-14.
Office Action for U.S. Appl. No. 11/774,481, dated Apr. 29, 2010, 19 pages.
International Search Report and Written Opinion for International Application No. PCT/US2007/072954, dated Feb. 1, 2008, 5 pages.
International Preliminary Report on Patentability for International Application No. PCT/US2007/072954, dated Jan. 6, 2009, 5 pages.
Office Action for Canadian Application No. 2,667,573 dated Jun. 13, 2014, 3 pages.
Office Action for Canadian Application No. 2,667,573, dated Jul. 8, 2015, 4 pages.
Office Action for Canadian Application No. 2,667,573, dated Jun. 14, 2016, 2 pages.
Supplementary European Search Report for European Application No. 07868561.7, dated Jan. 2, 2012, 7 pages.
International Search Report and Written Opinion for International Application No. PCT/US2007/082373, dated Sep. 22, 2008, 8 pages.
International Preliminary Report on Patentability for International Application No. PCT/US2007/082373, dated Apr. 28, 2009, 7 pages.
Office Action for U.S. Appl. No. 12/582,675, dated Nov. 23, 2012, 13 pages.
Office Action for U.S. Appl. No. 12/582,675, dated Oct. 3, 2014, 11 pages.
Office Action for U.S. Appl. No. 12/582,675, dated Mar. 25, 2016, 16 pages.
Office Action for U.S. Appl. No. 12/582,675, dated Aug. 24, 2017, 17 pages.
Office Action for U.S. Appl. No. 12/582,675, dated Jan. 18, 2017, 15 pages.
Office Action for U.S. Appl. No. 12/582,675, dated Jul. 17, 2015, 13 pages.
Office Action for U.S. Appl. No. 12/582,675, dated Aug. 9, 2013, 11 pages.
Office Action for U.S. Appl. No. 13/106,754, dated Jul. 3, 2012, 8 pages.
Office Action for U.S. Appl. No. 14/709,318, dated Jul. 7, 2017, 19 pages.
Office Action for U.S. Appl. No. 14/709,318, dated Feb. 14, 2018, 19 pages.
Office Action for U.S. Appl. No. 12/011,193, dated Nov. 10, 2010, 12 pages.
Office Action for U.S. Appl. No. 12/011,193, dated Jul. 22, 2011, 17 pages.
Office Action for U.S. Appl. No. 12/011,193, dated Nov. 16, 2011, 15 pages.
Office Action for U.S. Appl. No. 12/011,193, dated Oct. 2, 2013, 16 pages.
Office Action for U.S. Appl. No. 12/011,193, dated Aug. 4, 2014, 20 pages.
Office Action for Canadian Application No. 2,680,281 dated Jan. 23, 2015, 4 pages.
Office Action for Canadian Application No. 2,680,281 dated Feb. 8, 2017, 3 pages.
Office Action for Canadian Application No. 2,680,281 dated Feb. 8, 2018, 2 pages.
Office Action for European Application No. 08754882.2, dated Feb. 11, 2010, 4 pages.
Office Action for U.S. Appl. No. 12/045,666, dated Oct. 6, 2011, 17 pages.
Office Action for U.S. Appl. No. 12/045,666, dated Jun. 4, 2012, 19 pages.
Office Action for U.S. Appl. No. 12/045,666, dated Jul. 19, 2013, 19 pages.
Office Action for U.S. Appl. No. 12/045,666, dated on May 21, 2014, 19 pages.

(56) References Cited

OTHER PUBLICATIONS

International Search Report and Written Opinion for International Application No. PCT/US2008/056451, dated Jun. 24, 2008, 8 pages.
International Preliminary Report on Patentability for International Application No. PCT/US2008/056451, dated Sep. 8, 2009, 6 pages.
Office Action for U.S. Appl. No. 14/550,804, dated Jun. 29, 2017, 29 pages.
Office Action for U.S. Appl. No. 14/550,804, dated Jan. 25, 2018, 30 pages.
Office Action for U.S. Appl. No. 12/032,637, dated Mar. 21, 2011, 9 pages.
International Search Report and Written Opinion for International Application No. PCT/US2008/054184, dated Jul. 2, 2008, 12 pages.
International Preliminary Report on Patentability for International Application No. PCT/US2008/054184, dated Aug. 19, 2009, 11 pages.
Office Action for U.S. Appl. No. 12/039,692, dated Nov. 24, 2010, 5 pages.
International Search Report and Written Opinion for International Application No. PCT/US2008/055390, dated Aug. 22, 2008, 10 pages.
International Preliminary Report on Patentability for International Application No. PCT/US2008/055390, dated Sep. 1, 2009, 8 pages.
International Search Report and Written Opinion for International Application No. PCT/US2008/055197, dated Aug. 29, 2008, 8 pages.
International Preliminary Report on Patentability for International Application No. PCT/US2008/055197, dated Sep. 1, 2009, 6 pages.
Office Action for Canadian Application No. 2,680,797, dated Jan. 26, 2015, 5 pages.
Office Action for Canadian Application No. 2,680,797, dated Jul. 28, 2016, 4 pages.
Office Action for U.S. Appl. No. 12/048,128, dated Dec. 23, 2011, 14 pages.
Office Action for U.S. Appl. No. 12/048,128, dated Sep. 13, 2012, 14 pages.
Office Action for U.S. Appl. No. 12/048,128, dated Mar. 26, 2015, 17 pages.
Office Action for U.S. Appl. No. 12/048,128, dated Feb. 4, 2016, 23 pages.
International Search Report and Written Opinion for International Application No. PCT/US2008/056899, dated Mar. 27, 2009, 15 pages.
International Preliminary Report on Patentability for International Application No, PCT/US2008/056899, dated Sep. 15, 2009 12 pages.
Office Action for European Application No. 07869177.1, dated Mar. 13, 2015, 6 pages.
Office Action for Canadian Application No. 2,672,437 dated Oct. 14, 2014, 3 pages.
Office Action for U.S. Appl. No. 11/637,300, dated Sep. 30, 2008, 11 pages.
Office Action for U.S. Appl. No. 11/955,299, dated Oct. 18, 2011, 17 pages.
Office Action for U.S. Appl. No. 11/955,299, dated Feb. 22, 2012, 17 pages.
International Search Report and Written Opinion for International Application No. PCT/US2007/087305, dated Jul. 3, 2008, 7 pages.
International Preliminary Report on Patentability for International Application No. PCT/US2007/087305, dated Jun. 16, 2009, 6 pages.
Office Action for U.S. Appl. No. 12/049,113, dated Jan. 25, 2011, 15 pages.
International Search Report and Written Opinion for International Application No. PCT/US2008/057110, dated Aug. 5, 2008, 6 pages.
International Preliminary Report on Patentability for International Application No. PCT/US2008/057110, dated Sep. 15, 2009, 5 pages.
Office Action for U.S. Appl. No. 13/838,244, dated Feb. 9, 2015, 15 pages.
Office Action for U.S. Appl. No. 13/838,244, dated Apr. 22, 2016, 33 pages.
Office Action for U.S. Appl. No. 13/838,244, dated Nov. 30, 2016, 24 pages.
Office Action for U.S. Appl. No. 13/838,244, dated Sep. 29, 2015, 28 pages.
International Search Report and Written Opinion for International Application No. PCT/US2014/030837, dated Jul. 24, 2014, 10 pages.
Office Action for U.S. Appl. No. 11/923,554, dated Dec. 23, 2009, 9 pages.
Office Action for U.S. Appl. No. 11/923,554, dated Nov. 12, 2010, 20 pages.
Office Action for U.S. Appl. No. 11/923,573, dated Jun. 22, 2011, 14 pages.
Office Action for U.S. Appl. No. 11/923,573, dated Oct. 14, 2010, 12 pages.

\* cited by examiner

SYSTEM AND METHOD FOR SCORING AND RANKING DIGITAL CONTENT BASED ON ACTIVITY OF NETWORK USERS

CROSS-REFERENCE TO RELATED APPLICATIONS

This application claims priority to and the benefit of U.S. Provisional Patent Application No. 61/792,191, entitled SYSTEM AND METHOD FOR SCORING AND RANKING DIGITAL CONTENT BASED ON ACTIVITY OF NETWORK USERS, filed Mar. 15, 2013, the disclosure of which is incorporated herein by reference in its entirety. This application is related to U.S. patent application Ser. No. 13/838,244, entitled SYSTEM AND METHOD FOR SCORING AND RANKING DIGITAL CONTENT BASED ON ACTIVITY OF NETWORK USERS, filed Mar. 15, 2013, the disclosure of which is incorporated herein by reference in its entirety.

FIELD

This disclosure relates generally to the distribution of digital media over networks and broadcast systems. More particularly but not exclusively, this disclosure relates to systems and methods for scoring the popularity of digital media based on listener response and interaction.

BACKGROUND

The emergence of the Internet, and in particular, broadband connections, along with efficient media compression techniques has lead to rapid growth in the distribution of digital media. Digital audio has preceded digital video in this evolution because its smaller size allowed easier distribution within the constraints of the early Internet and storage systems. Webcasters including Musicmatch, Real Networks, Live365, Launchcast and others began sending digital audio streams to clients across the Internet. While the broadcast media (radio and television) was constrained to relatively small numbers of channels and no interactivity, webcast radio offered a virtually unlimited number of channels with each individual user having the capability interact with their programming.

Music ranking services have typically focused on radio play and sales. While radio play is still very popular, more and more people are listening to music streamed over the Internet and/or downloaded and pre-cached to various communication devices to be listened to at a later time. Rankings based on radio play alone therefore do not take into account a large number of listeners of these streamed and pre-cached multimedia Internet-based services. In addition, the radio rankings are generally based solely on which songs are played by a DJ and do not take into account the number of listeners actually listening to the songs. In addition, radio does not offer any way to sense whether a user listens to a song, turns the radio off when a song is played or changes the channel when a song is played.

SUMMARY

Exemplary embodiments of the teachings disclosed herein are shown in the drawings are summarized below. These and other embodiments are more fully described in the Detailed Description section. It is to be understood, however, that there is no intention to limit the claims to the forms described in this Summary or in the Detailed Description. One skilled in the art can recognize that there are numerous modifications, equivalents and alternative constructions that fall within the spirit and scope of the disclosed teachings as expressed in the claims.

In one aspect the disclosure relates to a method and system of scoring digital content, the method includes receiving, at a server from a plurality of user devices, interaction data indicative of interaction of a corresponding plurality of users with respective ones of a plurality of content items rendered by the plurality of user devices. The interaction data may include first interaction data and second interaction data wherein the first interaction data and the second interaction data are respectively representative of different first and second user interactions with ones of the plurality of content items. The method also includes determining, for each of the plurality of content items, a total initiation number representing a number of times that each of the plurality of content items was at least partially rendered by ones of the plurality of user devices. In addition, the method includes determining, for each of the plurality of content items and based at least upon a portion of the first interaction data associated with each of the plurality of content items, a first metric count. The method also includes determining, for each of the plurality of content items and based at least upon a portion of the second interaction data associated with each of the plurality of content items, a second metric count and determining, for each of the plurality of content items, respective first and second statistical measures of the first metric count and the second metric count associated with each of the plurality of content items, Finally, the method includes determining, for each of the plurality of content items, a third statistical measure based upon the total initiation number associated with each of the plurality of content items and determining, based on the first, second and third statistical measures associated with each of the plurality of content items, a score for each of the plurality of content items.

In another aspect the disclosure relates to a system and method for content scoring which includes receiving, at a server from a plurality of user devices, first interaction data. The first interaction data is indicative of interaction by a corresponding plurality of users with a first content item respectively rendered by the plurality of user devices wherein the first interaction data includes first rendering frequency data indicative of a number of times rendering of the first content item was initiated during a first predetermined time period. The method further includes receiving, at the server from the plurality of user devices, second interaction data indicative of interaction by the corresponding plurality of users with a second content item respectively rendered by the plurality of user devices wherein the second interaction data includes second rendering frequency data indicative of a number of times rendering of the second content item was initiated during a second predetermined time period. In addition, the method includes determining a first content score associated with the first content item based upon the first interaction data and the first rendering frequency data and determining a second content score associated with the second content item based upon the second interaction data and second rendering frequency data.

The disclosure also pertains to a system and method which involves receiving, at a server from a plurality of user devices, first interaction data indicative of interaction of a corresponding plurality of users with a first content item respectively rendered by the plurality of user devices. The method further involves receiving, at the server from the plurality of user devices, second interaction data indicative of interaction of the corresponding plurality of users with a second content item respectively rendered by the plurality of user devices wherein the first content item and the second content item are associated with a first entity. The method also includes determining a first content score associated with the first entity based upon the first interaction data and the second interaction data.

In another aspect, the disclosure relates to a system including a processor configured to receive, at a server from a plurality of user devices, first interaction data indicative of interaction of a corresponding plurality of users with a content item respectively rendered by the plurality of user devices during a first time period. The processor is further configured to determine a rate of change of the first interaction data and predict a predicted content score associated with the content item based at least upon the rate of change of the first interaction data.

The disclosure also pertains to a system including a processor configured to receive, at a server from a plurality of user devices, first interaction data indicative of interaction of a corresponding plurality of users with a first content item respectively rendered by the plurality of user devices during a first time period. The processor is further configured to determine, based upon the first interaction data, a predictive model for content scoring and to predict, using the predictive model, a content score associated with a second content item based at least in part upon an attribute of the second content item.

As previously stated, the above-described embodiments and implementations are for illustration purposes only. Numerous other embodiments, implementations, and details of the systems and methods described herein are easily recognized by those of skill in the art from the following descriptions and claims.

BRIEF DESCRIPTION OF THE DRAWINGS

Various objects and advantages and a more complete understanding of the present disclosure and teachings herein are apparent and more readily appreciated by reference to the following Detailed Description and to the appended claims when taken in conjunction with the accompanying Drawings wherein:

DETAILED DESCRIPTION

Described herein are systems and methods used to judge the popularity of content (e.g., songs) communicated to user devices through an Internet-based streaming or pre-caching service. In one aspect, the disclosed system and method leverages the capability of Internet-based content streaming and pre-caching services to receive feedback relating to user interaction with content. In one embodiment the popularity of content is represented by a score that is based on a mathematical computation using various listener interaction parameters. When listeners listen to content online, they may be allowed to interact with the user application and rate the content for likes (e.g., "hearts") or dislikes (e.g., "bans"), or skip a track or change the channel. A server system collects all the above information for each track rendered though the user application, and along with the listening frequency, combines these parameters using weighting factors to create a score for the track. If a user indicates a positive response to a content item (e.g., the user expresses that the item is "liked" and/or the user allows the content item to be rendered in its entirety), this results in a positive contribution to the score. Likewise, if a user bans the content item from being rendered in the future, skips the content item or, in embodiments in which multiple "stations" of content are provided, changes stations, this will result in a negative impact on the score.

Figure 1:
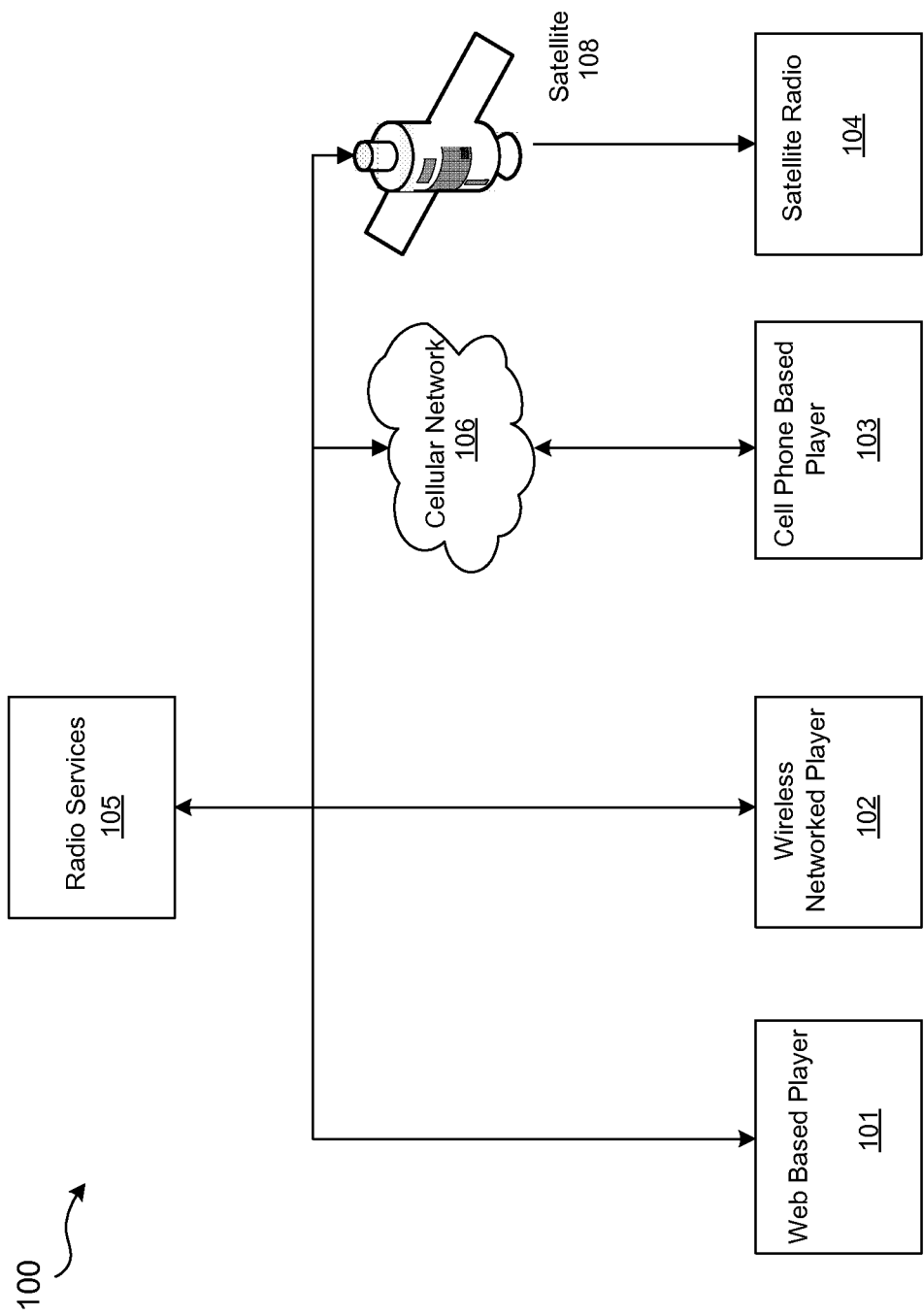
FIG. 1 is an illustration of one embodiment of a system for providing content to multiple clients in accordance with the disclosure.

Referring now to FIG. 1, there is shown a system 100 in which a variety of clients access, over a variety of networks, services implementing a Radio Service 105 in a manner consistent with systems and methods described herein. The Radio Service 105 can offer various streams of content matching one or more channel profiles, genre profiles or personal preference profiles. The Radio Service 105 also allows devices to pre-cache content to be played later in addition to streaming real time content.

Various devices have access to the Radio Service 105. A Web Based Player 101 is a media player that has a persistent connection to the Internet and accesses Radio Services 105 via a web-services interface. A Wireless Networked Player 102 is a media player that connects periodically or opportunistically to wireless networks, for example, the IEEE 802.11 family of wireless networks. The Wireless Networked Player 102 synchronizes content and personalization profiles while connected, and need not be connected while rendering personalized radio. This configuration is especially suitable for hand-held portable media players.

A Cellular Phone Based Player 103 connects to Radio Services 105 over a Cellular Network 106. Because Cellular networks may be very busy during peak times but have excess capacity during off-peak hours, the Cell Phone Based Player 103 client can synchronize content and/or personalization profiles during off peak hours, resulting in a more economical use of the network.

A Satellite Radio 104 can utilize the content sequencing logic to de-couple the rendering of audio for the end-user from the reception of content from a Satellite 108. This allows the radio to build a cache of content during periods of good reception, and to play back cached content with no audible drop-outs due to loss of signal in non-real time. The caching of content on this satellite radio client means that the radio can support more channels than the bandwidth of the satellite connection could support if broadcasting in real-time.

The Satellite Radio 104 may also have other connectivity to Radio Services 105. For example, if the Satellite Radio 104 additionally has an uplink to Radio Services 105 via an Internet, Wireless, or Cellular network connection, personalized user profile changes on the device can be synchronized back to the Radio Services 105 and ultimately to other clients. In addition, indications of user interactions during rendering of content can also be communicated over the uplink. Otherwise, the Satellite Radio 104 can operate on a non-synchronized local profile, or can receive a personalized profile edited on other clients and transmitted across the Satellite link.

Figure 2:
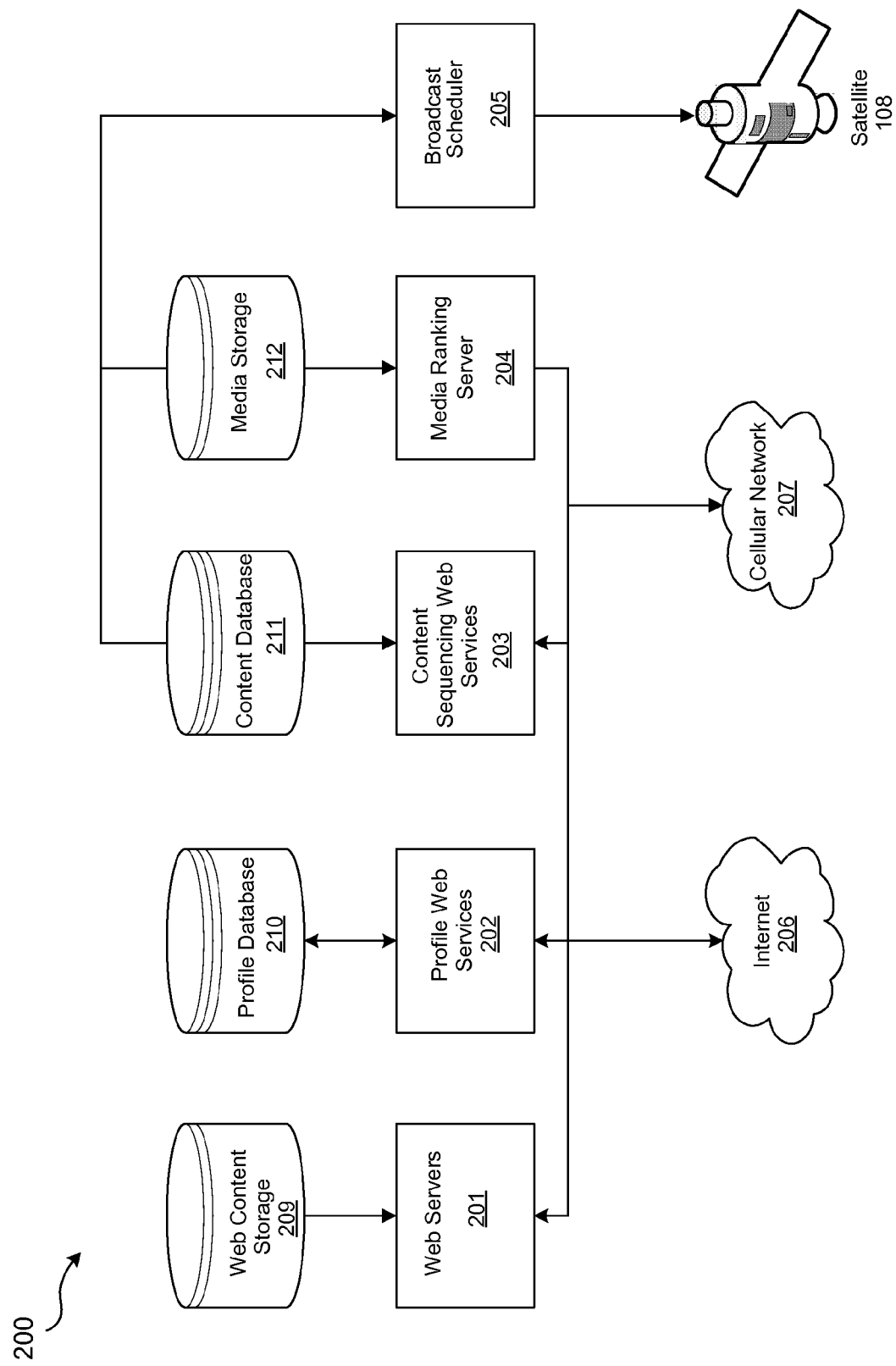
FIG. 2 is an illustration of one embodiment of components comprising radio services in accordance with aspects of the disclosure.

Referring now to FIG. 2, components 200 comprising one embodiment of Radio Services 105 are detailed. Web Servers 201 and Web Content Storage 209 serve HTML, Javascript, Images, Macromedia Flash and/or other objects utilized by web browser clients. Profile Web Services 202 and a Profile Database 210 store end-user specific profile information including station customizations, content preferences, and history of recent end-user playback and other events.

Content Sequencing Web Services 203 support content refresh for clients that cache content, as well as 'next track' requests for thin clients such as browser based players. The Content Database 211 may be used to catalog the available content.

Media Ranking Server 204 and Media Storage 212 may be used to serve content in the form of digital media files, such as are described in the related applications, to clients. In addition, the Media Ranking Server 204 receives indications of user interaction associated with rendering of media content on various communication devices such as the web based player 101, the wireless player 102, the cellular phone based player 103 and the satellite radio 104. The Media Ranking Server 204 determines rankings for the content using the methods described herein.

A Broadcast Scheduler 205 decides which tracks should be sent across the satellite link to Satellite 108 for broadcast to Satellite Radios 104. Collectively, the web services are available across the Internet 206 or connected Cellular Networks 207.

Figure 3:
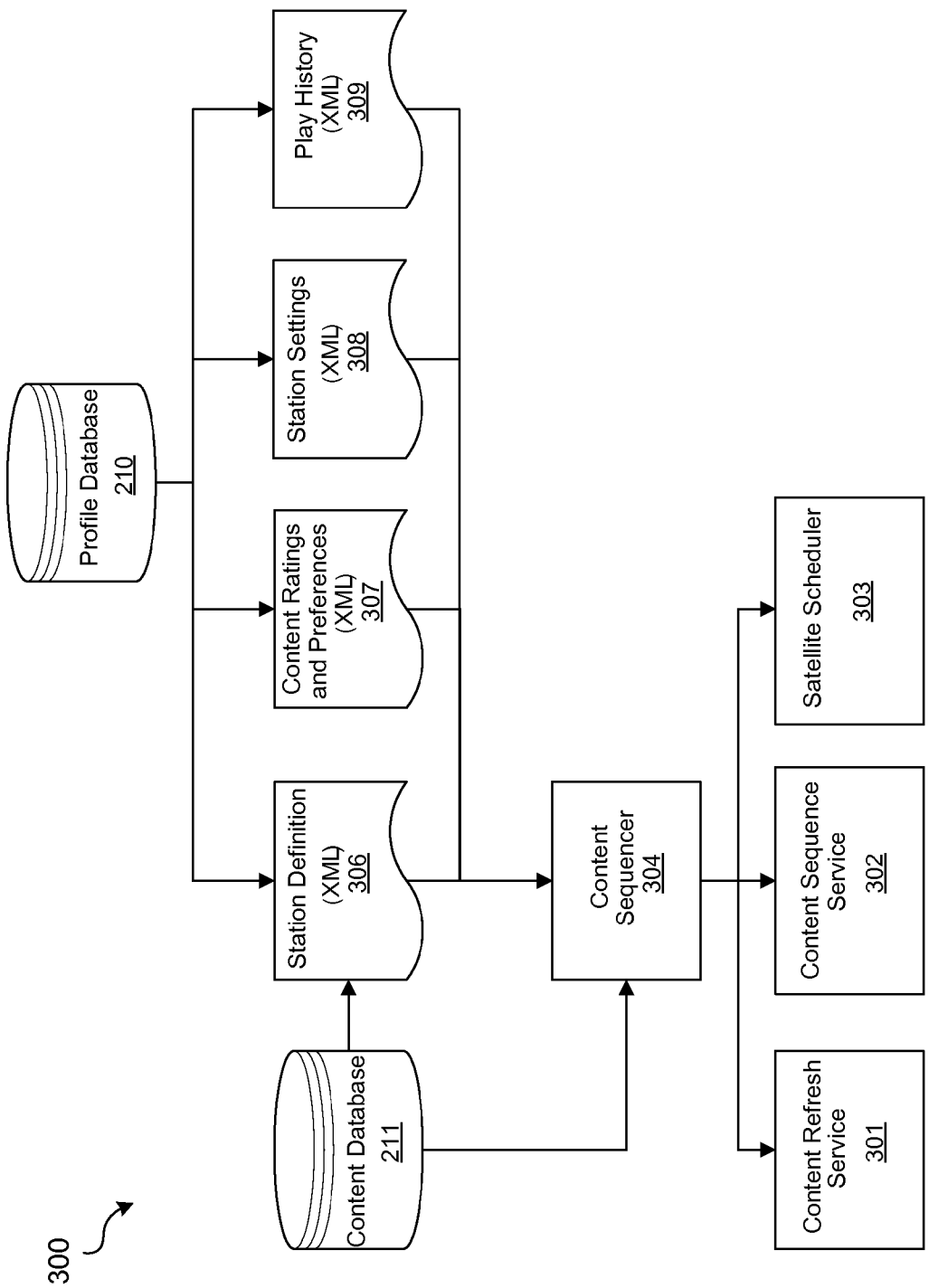
FIG. 3 is an illustration of one embodiment of a subsystem of radio services related to content sequencing in accordance with aspects of the disclosure.

Referring now to FIG. 3, the configuration of one embodiment of a web-based radio client system 300 is described.

The web-based radio client system 300 includes one or more Content Sequencers 304. Content Database 211 and Profile Database 210 provide the data used in Content Sequencer 304. The Content Database 211 stores a catalog of available radio audio tracks and may store the Station Definitions 306 of pre-programmed radio stations.

A Profile Database 210 stores end-user's Content Ratings and Preferences 307, Station Settings 308 and Play History 309. In an exemplary embodiment, this data is expressed as one or more XML documents or trees (nodes). The Profile Database 210 may store Station Definitions 306 where the Station Definition can be custom-made by the end-user. In some embodiments user customization information including Content Ratings and Preferences, Station Settings, Play History, and/or other user customization criteria may be stored in a common user profile in Profile Database 210. In other embodiments, user customization information may be stored in one or more separate user profiles.

In some embodiments, user profiles may be synchronized between two or more types of clients, facilitating user profile updating and synchronization across multiple types of clients used by a particular end-user. For example, in some embodiments user profiles may be synchronized between a Web Based Player 101 and a Wireless Networked Player 102, Cell Phone Based Player 103 or Satellite Radio 104 so that the user profile information on all synchronized clients are updated to the most recent profile. Additional details of one embodiment of such synchronization are further described below with respect to a Sometimes Connected Player 501.

Content Sequencer 304 utilizes the Content Database 211 in conjunction with the Station Definition 306, Content Ratings and Preferences 307, and Station Settings 308 to create and maintain a sequence of radio tracks for a particular radio station.

The Content Sequencer 304 may be used by more specialized components to deliver various services to the clients. A Content Refresh Service 301 may utilize the Content Sequencer 304 to optimize the choice of tracks to download to clients. A primary specialization in one embodiment is that the Content Refresh Service 301 typically does not choose tracks that are already in the client cache.

Content Sequence Service 302 handles "thin" clients such as Web Browser based players that do not have their own Content Sequencer 304. These clients simply request the next radio track for playback and then stream the indicated track. When the track finishes, the client requests the subsequent track to play, and so on.

Satellite Scheduler 303 multiplexes the output of Content Sequencer 304 for the stations that are broadcast on the satellite link. The Satellite Scheduler 303 specializes the Content Sequencer 304 output to optimize the utilization of the satellite link: content that is most likely to be played by the players and least likely to already be in the cache is prioritized.

Figure 4:
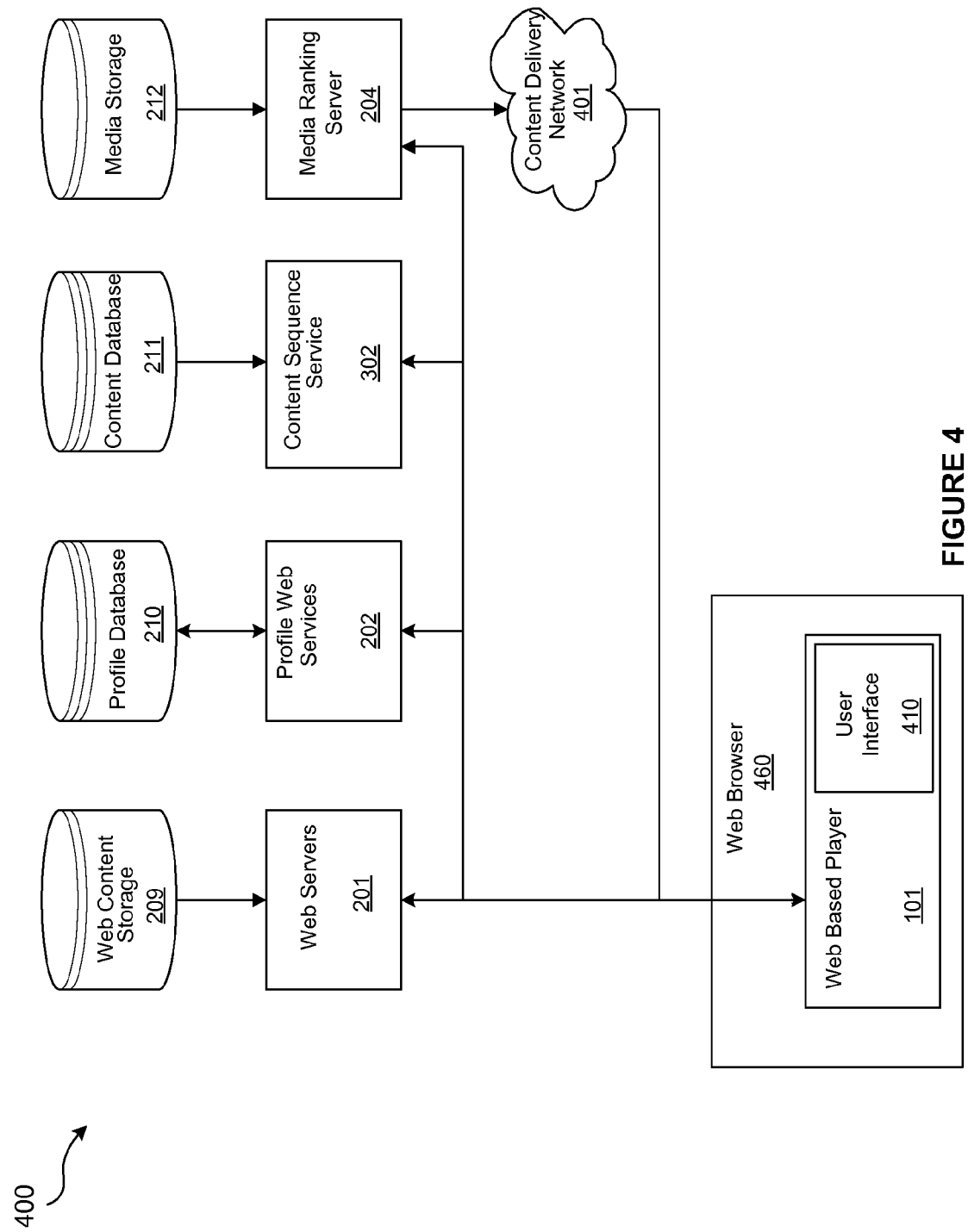
FIG. 4 is an illustration of one embodiment of a web based radio client in accordance with aspects of the disclosure.

Referring now to FIG. 4, the configuration of one embodiment of a web-based radio client system 400 in a manner consistent with the disclosure is described.

As shown in FIG. 4, a Web Based Player 101 may be loaded into a user's web browser 460 in one exemplary embodiment. The Web Servers 201 load a combination of Javascript programming, Flash objects, HTML, and similar browser content to implement a media player in the browser. On Microsoft operating systems, an Active X control may be employed to drive Windows Media Player or similar functionality within the browser.

In alternate embodiments, the Web Based Player functionality may be embedded in a standalone software client application or hardware devices such as consumer electronics components for a home stereo or entertainment system. However, in this configuration, the Web Based Player is presumed to have a continuous, persistent network connection.

The Web Based Player 101 interacts directly with the Profile Web services 202 to provide information regarding user preferences as they are indicated by the end user through a user interface 410 of the player 101. The Web Based Player 101 interacts directly with the Content Sequence Service 302 to get the next track to play in response to various events triggered by the user interface or the underlying media player, for example a user initiated request to skip the current track or the a player report that the current track has finished.

The user interface 410 also provides ways for the user to interact during rendering of the tracks so as to provide feedback to the Media Ranking Server 204. The interactions can provide indications of how the user likes or dislikes a track. For example, the user interface 410 can include a "like" or "heart" button that can be actuated if the user likes a track. The user interface 410 can also include a "dislike" button that can be actuated by the user to indicate that they dislike the track. The user interface 410 can also include an "indifferent" button that the user can actuate to indicate that they have no strong feeling one way or another about a song. The user interface 410 can also include a skip button to skip a track currently being rendered. The user interface 410 also provides a way for the user to change channels while a track is being rendered.

The Web Based Player 101 communicates indications of the user interactions with the user interface 410 to the Media Ranking Server 204. In one embodiment, the user interaction indications can be sent to the Media Ranking Server 204 in real time after the interaction takes place. In this embodiment, the Media Ranking Server 204 is aware of which track is being rendered on the Web Based Player 101 when the user interaction takes place and, therefore, the indication sent to the Media Ranking Server 204 need not indicate the identity of the track being rendered. In other embodiments, the user interaction indications can be sent at a later time and can include a track identifier and a time of rendering such that the Media Ranking Server 204 can associate a specific user interaction with a specific track at a specific time.

In addition to communicating user interactions to the Media Ranking Server 204, the Web Based Player 101 can communicate an indication that a track has finished to the Media Ranking Server. The Media Ranking Server 204 uses the information received from the Web Based Player to determine rankings for content using the methods described herein.

Figure 5:
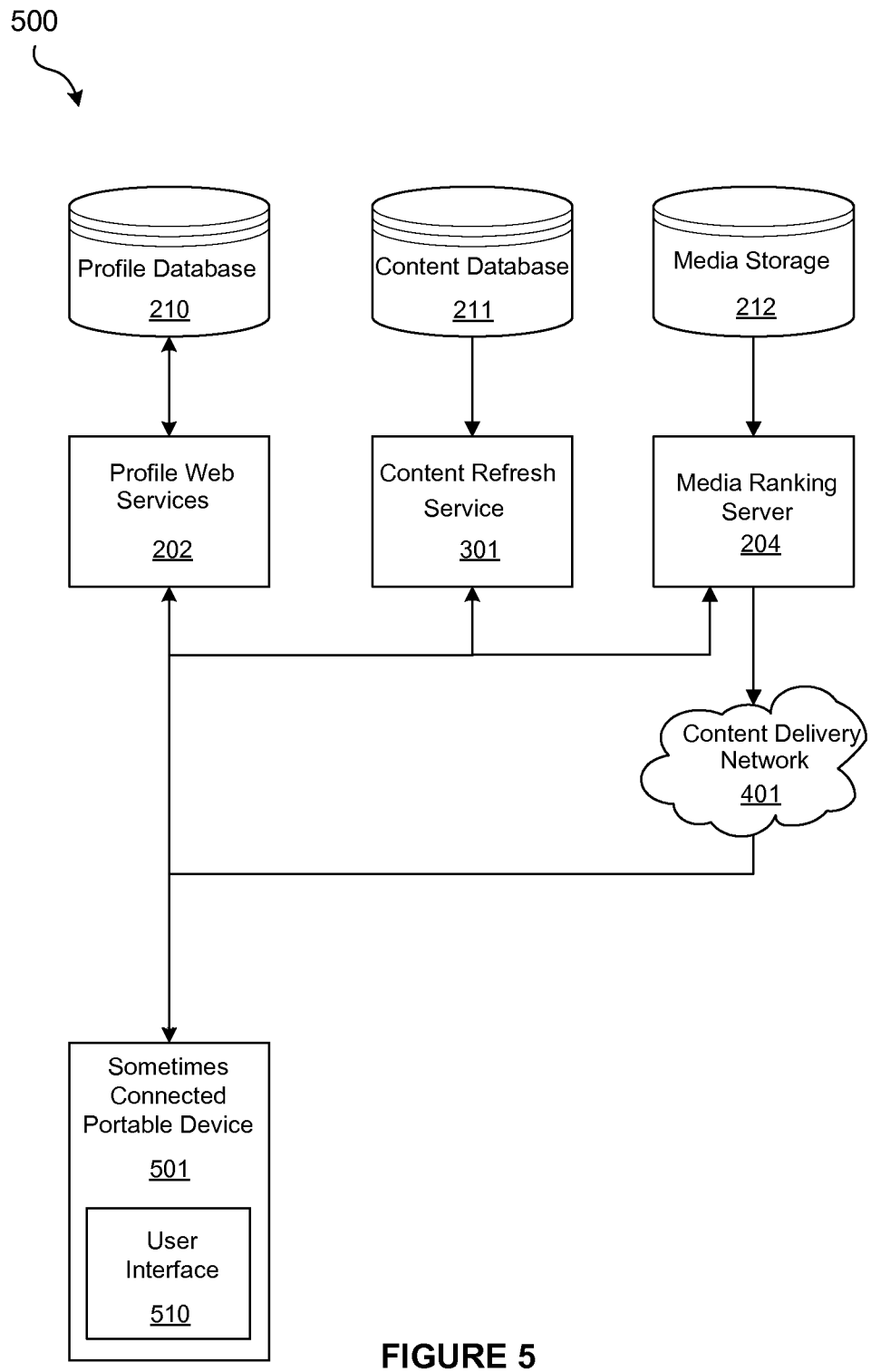
FIG. 5 is an illustration of one embodiment of a system supporting a sometimes connected player in accordance with aspects of the disclosure.

Referring now to FIG. 5, one embodiment of a configuration 500 supporting a Sometimes Connected Portable Device 501 is described. The Sometimes Connected Portable Device 501 includes Wireless Networked Players 102 and Cellular Phone Based Players 103. These players are designed to play and manage personalized portable radio stations, such as are described in the related applications, while only intermittently connected to the network.

The Sometimes Connected Portable Device 501 synchronizes profile data including Content Ratings and Preferences 307, Station Settings 308, and Play History 309 while connected. In one embodiment the synchronization is bi-directional.

Once the portable device 501 has synchronized the end-user profile elements, it can request a content refresh through the Content Refresh Service 301. In an exemplary embodiment, the portable device 501 sends its current inventory associated with the station to refresh to the Content Refresh Service 301. The Content Refresh Service 301 creates a priority ordered list of content for the device to download. The device 501 then downloads the indicated content from the Media Ranking Server 204. Optionally, the device 501 may request the content from a Content Delivery Network 401. The device uses the acquired content to supplement the given station. The device then repeats the process for the other stations.

The portable device 501 includes a user interface 510. The user interface 510 provides ways for the user to interact during rendering of the tracks so as to provide feedback to the Media Ranking Server 204 in a manner similar to the user interface 410 of the web based player 101.

The sometimes connected portable device 501 communicates indications of the user interactions with the user interface to the Media Ranking Server 204. Because the portable device 501 is only connected intermittently to the Media Ranking Server 204, the user interaction indications are only sent to the Media Ranking Server 204 at a time when the portable device 501 is in a connected state. For this reason the indications include a track identifier and a time of rendering such that the Media Ranking Server 204 can associate a specific user interaction with a specific track at a specific time.

In addition to communicating user interactions to the Media Ranking Server 204, the portable device 501 can communicate an indication that a track has finished to the Media Ranking Server. The Media Ranking Server 204 uses the information received from the portable device 501 to determine rankings for content using the methods described herein.

Figure 6:
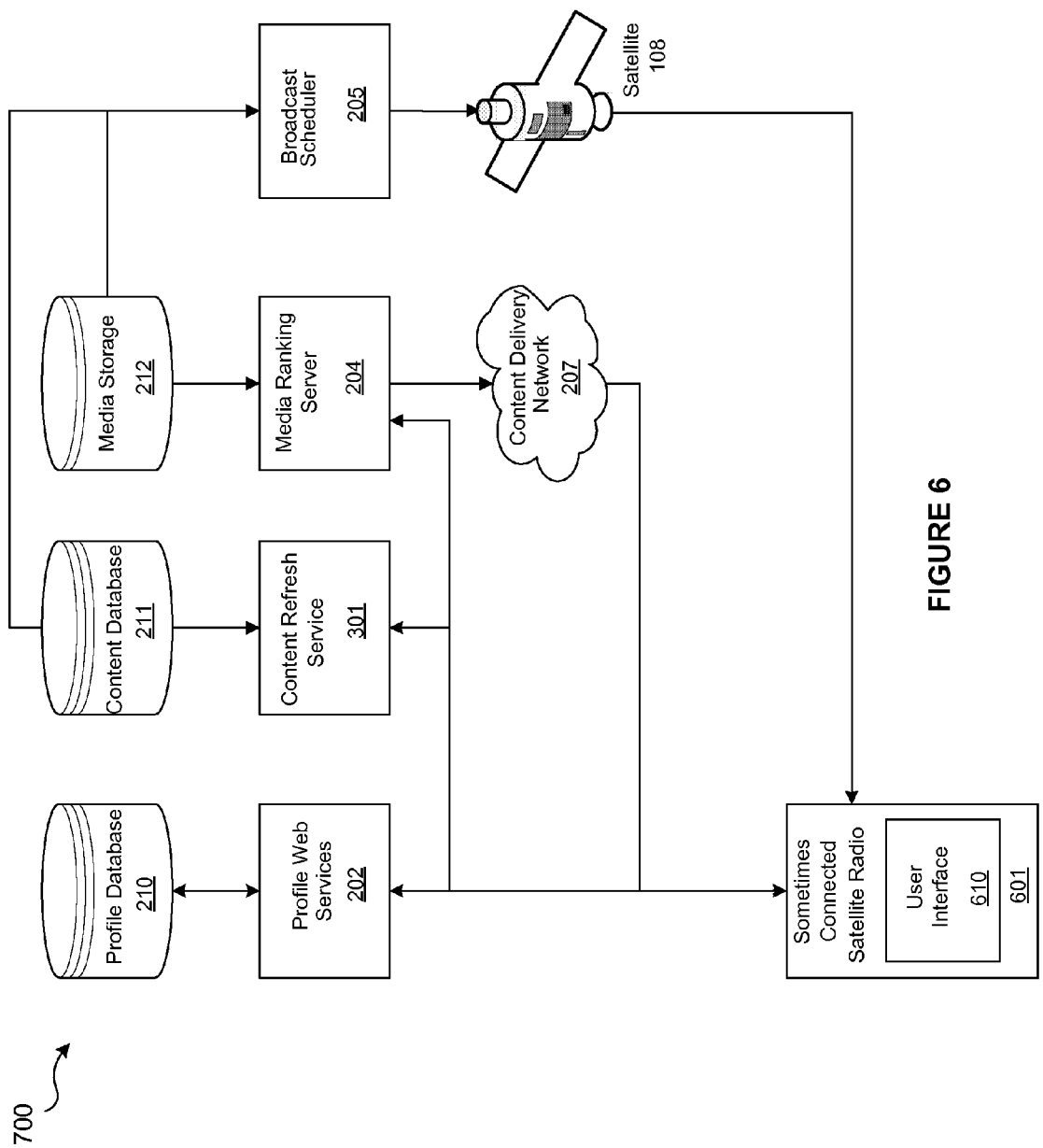
FIG. 6 is an illustration of one embodiment of a system supporting a sometimes connected satellite radio in accordance with aspects of the disclosure.

Referring now to FIG. 6, one embodiment of a configuration 600 supporting a Sometimes Connected Satellite Radio 601 is described. The Sometimes Connected Satellite Radio 701 is similar to the Sometimes Connected Portable Device 501 shown in FIG. 5, with the additional capability of receiving content from a Satellite 108.

The Satellite Radio 601 includes a user interface 610. The user interface 610 provides ways for the user to interact during rendering of the tracks so as to provide feedback to the Media Ranking Server 204 in a manner similar to the user interfaces 410 and 510 discussed above.

The satellite radio 601 communicates indications of the user interactions with the user interface to the Media Ranking Server 204 via a wired or wireless uplink connection different than the connection to the satellite 108. The satellite radio 601 can communicate the indications to the Media Ranking Server using any of the methods described above in reference to the Web Based Player 101 and the portable device 501.

Figure 7:
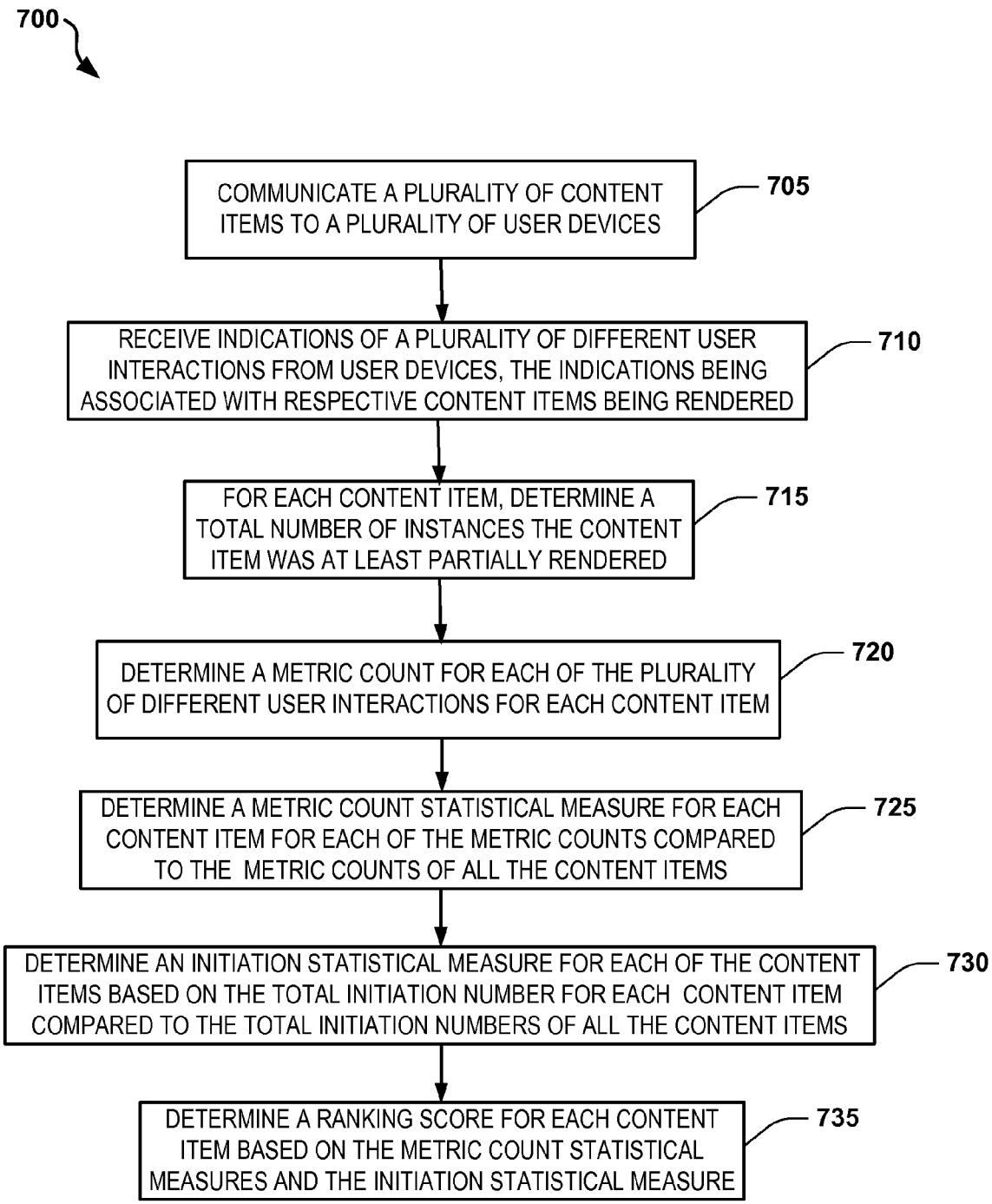
FIG. 7 is flowchart of an exemplary process for determining ranking scores of content items based on user interactions in accordance with the disclosure.

Referring to FIG. 7, an exemplary process 700 for determining ranking scores of content items based on user interactions includes the stages shown. The process 700 can be performed by various components of FIGS. 2-6. The process 700 starts at stage 705, where a plurality of content items (e.g., audio) are communicated to a plurality of user devices. Depending on the type of user device (e.g., web based player 101, wireless player 102, cell phone player 103 and satellite radio 104), the content items can be communicated by one or more of the Media Ranking Server 204, the satellite 108 via the broadcast scheduler 205, the content refresh service 301 or the content sequence service 302. The content items can be streamed in real time to the user devices or pre-cached to the user devices.

At stage 710, the Media Ranking Server 204 receives indications of a plurality of different user interactions from the plurality of user devices. The indications are associated with respective ones of the plurality of content items communicated to the user devices at stage 705. In the case of content items that are streamed in real time, the indications of user interaction need not identify the content item or the rendering time since the Media Ranking Server can determine which content items are being streamed to which user devices. In the case of devices that have pre-cached content items, the indications of user interaction include an identifier that identifies the content item with which the user interaction is associated and optionally, the indications of user interaction include a time that the interaction occurred.

Preferably, the indications of user interaction include at least a first response type and a second response type where the first and second response types represent different user interactions. The user interactions represented by the first and second response types can include interactions that are positive in terms of increasing a ranking of the associated content item, or negative in terms of decreasing the ranking of the associated content item. Positive user interactions can include, but not be limited to, one or more of the following indications:

Finishes—indicates that the content item was completed in its entirety

Likes or Hearts—indicates that the content item was marked by the listener as a "like"

Starts—indicates that rendering of a content item was started (used with user devices that pre-cache content items such that the Media Ranking Sever could not otherwise determine which content item was being rendered)

Requests—indicates a user has requested a content item after hearing the content item Repeat Requests—indicates that a user has made multiple requests for the same content item Searches—indicates that a user has searched for a content item Negative user interactions can include, but not be limited to, one or more of the following indications:

Bans—indicates that a content item or artist was marked as a "ban", meaning the listener did not want to hear the performance or artist again Dislikes—indicates that the content item was disliked by the listener Skips—indicates that the listener skipped to the next track, indicating they were not interested in listening to the content item to completion Change Stations—indicates that the station was changed by the listener during rendering of the content item Some user interactions are neither positive or negative, but can still be considered in determining a ranking score, such as the following indication:

Indifference—indicates that listener has no strong feeling one way or the other about a content item In one embodiment, a listener is limited to just one Like, Heart or Dislike indication for each rendering of a content item. In this way a user cannot overly influence the rankings by inputting multiple indications.

At stage 715, the Media Ranking Server 204 determines a total number of instances where rendering was at least initiated for each content item at the plurality of user devices. This determination can be made by totaling the number of times a content item was streamed in real time to one of the user devices and the number of Start indications received from user devices that pre-cached the content item and then initiated rendering of the cached content item.

In one embodiment, the total number of initiation instances for each content item is scaled in order to arrive at a measure between 0 and 1, referred to as a fractional Start metric or $S_f$. In this embodiment, the total number of initiation instances for each content item can be divided (scaled) by the total number of initiation instances that the content item in the top $99^{th}$ percentile position exhibited. For example, if there were 100 content items and the second most rendered content item (the $99^{th}$ percentile position) experienced 1,000,000 initiations, then the total number of initiation instances for each of the content items would be divided by 1,000,000. The resulting scaled total initiation measure would be capped at 1.0 for any content items with more than 1,000,000 initiations (i.e., the top 1%). The fractional Start metric can be calculated with the follow relationship:

$$S_f = \log\left(\frac{S}{S_{99}^*}\right) \tag{1}$$

where S is the total number of initiation instances for a particular content item, $S_{99}^*$ is the number of initiation instances for the content item in the $99^{th}$ percentile position of all content items in the ranking dataset, and $S_f$ is the fractional Start metric.

In one embodiment, the total number of initiations for a single content item resulting from one user can be limited to a maximum number for a specified period of time. This limitation could prevent a user from skewing the rankings of a content item. For example, if the total number of initiations is determined for a one week period, a number of initiations for one user for one content item can be limited to 7, that is one per day.

At stage 720, the Media Ranking Server 204 determines a metric count for at least a portion of the plurality of user interactions for which indications are received at stage 710. The metric counts determined at stage 720 can include any of the following, depending on the scoring algorithm used to determine ranking scores at stag 735, as described below:

1) Finishes (F)—the number of times the rendering of the content item was completed in its entirety
2) Likes or Hearts (H)—the number of times the content item was indicated by listeners as a "like"
3) Dislikes (D)—the number of times the content item was indicated by the listeners as a "dislike"
4) Bans (B)—the number of times the performance or artist was marked as a "ban", meaning the listener did not want to hear the performance or artist again
5) Skips (Sk)—the number of times the listener skipped to the next track, indicating they were not interested in listening to the performance to completion
6) Change Stations (CS)—the number of times the station was changed by the listener during the playing of the performance In one embodiment, the metric counts for the user interactions of each content item that are determined at stage 720 are scaled by the total number of initiations (S) for each particular content item in order to arrive at a fractional measure for the metric count having values between 0 and 1. The fractional metric counts can be determined at stage 720 using the following relations:

$$F_f = \log\left(\frac{F}{S}\right), \tag{2}$$

where $F_f$ is the fractional metric count for Finishes $$H_f = \log\left(\frac{H}{S}\right), \tag{3}$$

where $H_f$ is the fractional metric count for Likes or Hearts $$D_f = \log\left(\frac{D}{S}\right), \tag{4}$$

where $D_f$ is the fractional metric count for Dislikes $$B_f = \log\left(\frac{B}{S}\right), \tag{5}$$

where $B_f$ is the fractional metric count for Bans $$Sk_f = \log\left(\frac{Sk}{S}\right), \quad (6)$$

where $Sk_f$ is the fractional metric count for Skips $$CS_f = \log\left(\frac{CS}{S}\right), \quad (7)$$

where $CS_f$ is the fractional metric count for Change Stations.

At stage 725, the Media Ranking Server 204 determines a metric count statistical measure for each of the metric counts, or fractional metric counts. The metric count statistical measure can take the form of a Z-value for each of the metric counts, where Z-value is a statistical measure defined by the deviation of the value from the mean in terms of standard deviations. The various Z-values can be obtained from the following equation:

$$Z_i = \frac{i - \mu_i}{\sigma_i} \quad (8)$$

Here i is the fractional metric count in question (e.g. $F_f$, $H_f$, $D_f$, $B_f$, $Sk_f$, $CS_f$ etc.), as given by equations (2)-(7) above, $\mu_i$ is the mean of the metric across the dataset for all content items, and $\sigma_i$ is the standard deviation of the metric across the dataset for all content items.

At stage 730, the Media Ranking Server 204 determines an initiation statistical measure for each of the content items based on the total number of initiation instances (Starts (S) or fractional Starts ($S_f$)) determined at stage 715. The initiation statistical measure can be determined in a way similar to the metric count statistical measures by using equation (8) above. However, for the initiation statistical measure, i is the fractional Starts $S_f$ as determined at stage 715 using equation (1), for the content item of interest, $\mu_i$ is the mean of the fractional Starts $S_f$ across the dataset for all content items, and a, is the standard deviation of the fractional Starts $S_f$ across the dataset for all content items At stage 735, the Media Ranking Server 204 determines a ranking score for each of the content items based on the metric count statistical measures, and the initiation statistical measure. In one embodiment, a raw ranking score for each content item is determined using the following relation:

$$R = aZ_s + bZ_f + cZ_h + dZ_b + eZ_{sk} + fZ_{cs} \quad (9)$$

where a, b, c, d, e and f, are weights. In one exemplary embodiment, the weights in equation (9) for the raw ranking score R are set as follows:

$$a=0.45, b=0.20, c=0.35, d=-0.15, e=-0.25 \text{ and } f=-0.05 \quad (10a\text{-}10f)$$

The weights a, b and c are positive and are associated with the positive feedback metrics while the weights d, e and f are negative and are associated with negative feedback metrics. The weights were chosen such that a+b+c (all the positive metrics) equals 1.0. The negative weights e, f and g were chosen to be smaller than 1.0 (e.g., 0.45 in this example). The raw ranking score is then scaled to be in a range from 0 to 100. The final score, in this one exemplary embodiment, can be obtained by a scaling equation, where x is a scaling constant, set at 0.4 for this embodiment:

$$\text{Score} = \frac{100}{1 + xe^{-R}} \quad (11)$$

The ranking scores can be determined, for example, on a weekly or biweekly basis. Equation (11) is only exemplary and other scaling methods can be used. For example, the Media Ranking Server 204 can scale the score with a linear model going from 0 to 100 such as, $$\text{Score} = 100 * \frac{R - \text{Min}(R)}{\text{Max}(R) - \text{Min}(R)} \quad (12)$$

where Min and Max are the minimum and maximum raw ranking score R across the entire dataset of content items.

Alternatively, the scaled ranking score can be determine with a function similar to a logistic:

$$\text{Score} = 50*(erf(x*(R+y))+1) \quad (13)$$

where x and y are scaling constants.

The process 700, at stages 725 and 730, uses a Z-value for normalizing. However, other statistical measures such as median, percentile ranks etc., can be used to achieve similar normalization. For example, the following relation can be used to normalize metric counts instead of the Z-value method described above:

$$ZZ_i = \frac{i - Md_i}{P_{75i} - P_{25i}} \quad (14)$$

Here $P_{75i}$ and $P_{25i}$ are the 75$^{th}$ and 25$^{th}$ percentile metric counts, respectively, and $Md_i$ is the median metric count for the i$^{th}$ metric for a content item.

The ranking determined at stage 735 can be communicated to DJs involved in selection of content associated with stations or channels rendered by the user devices. The rankings could, for example, be used by DJs to adjust the frequency at which certain content is played. Similarly, the Content Sequencing Web Service 203 and/or the Content Sequencer 304 could be adapted to result in similar frequency adjustments based on the ranking scores.

The process 400 is exemplary only and modifications to the process can be made without departing from the scope of the methods described herein. For example, stages may be omitted, added or rearranged.

The weights shown in equations 10a-10f above were created using domain knowledge, but other suitable weights can be created through various optimization processes as well. For example, an optimization routine could be created to maximize the predictive capabilities of a predictive model. A predictive model for predicting the ranking score of a yet-to-be-rendered content item can be created using supporting data such as artist, genre, lyrics, time of year etc. The score may be predicted using a non-linear regression model (e.g., Random Forests) using the score as the dependent variable and a set of predictors as independent variables. In a typical modeling process, one would compute the score for data over a specified time span, the score as a function of days since first play over consecutive time partitions after release to look at score progression over time, and also compute the predictor variables for that time span.

Two exemplary types of prediction that may be possible include 1) prediction before the release of the content item, and 2) prediction soon after the release based on early returns to determine what the long term score can become. For pre-release prediction, predictor variables can include, but not be limited to, genre of performance, artist, label, date of release, length of song, keywords in lyrics, type of performance (e.g. concert, studio recording) etc., which can then be used in a regression model to predict the score. For post-release prediction, a predictor can use the above variables along with variables indicating ramp-up velocity (score change rate over time, start rate over time, heart rate over time etc.). In this way, the most impactful metrics will have the highest weight in the model.

Some embodiments of the systems and methods described herein may include computer software and/or computer hardware/software combinations configured to implement one or more processes or functions associated with the methods such as those described above and/or in the related applications. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the claimed systems and methods, or they may be of the kind well known and available to those having skill in the computer software arts, or they may be a combination of both.

Examples of computer-readable media within the spirit and scope of this disclosure include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of systems described herein may be implemented using assembly language, Java, C, C#, C++, or other programming languages and software development tools as are known in the art. Other embodiments of the described systems may be implemented in hardwired circuitry in place of, or in combination with, machine-executable software instructions.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

What is claimed is:

1. A system of scoring digital content including a server and a plurality of user devices in communication over a network, the server being configured to receive, from the plurality of user devices, interaction data indicative of interaction of a corresponding plurality of users with respective ones of a plurality of content items rendered by the plurality of user devices wherein the interaction data includes first interaction data and second interaction data wherein the first interaction data and the second interaction data are respectively representative of different first and second user interactions with ones of the plurality of content items, the server including a processor configured to determine scores for the plurality of content items by performing mathematical operations using the interaction data, the performing mathematical operations comprising configuring the processor to:
   determine, for each of the plurality of content items, a total initiation number representing a number of times that each of the plurality of content items was streamed in real time to ones of the plurality of user devices having a persistent connection to the Internet and a number of start indications received from ones of the plurality of user devices that connect periodically or opportunistically to wireless networks and that pre-cached the content item and then rendered the cached content item while not connected;
   determine, for each of the plurality of content items and based at least upon a portion of the first interaction data associated with each of the plurality of content items, a first metric count;
   determine, for each of the plurality of content items and based at least upon a portion of the second interaction data associated with each of the plurality of content items, a second metric count;
   determine, for each of the plurality of content items, respective first and second statistical measures of the first metric count and the second metric count associated with each of the plurality of content items;
   determine, for each of the plurality of content items, a third statistical measure based upon the total initiation number associated with each of the plurality of content items; and
   rank, based on the first, second and third statistical measures associated with each of the plurality of content items, each of the plurality of content items;
   stream, at frequencies based upon a ranking of one or more of the plurality of content items, the one or more of the plurality of content items to ones of the plurality of user devices.

2. The system of claim 1, wherein the processor is further configured to determine includes weighting the first and second statistical measures using a first weight and a second weight, respectively.

3. The system of claim 2, wherein the first weight has a positive value and the second weight has a negative value.

4. The system of claim 2, wherein the determining includes weighting the third statistical measure using a third weight.

5. The system of claim 4, wherein the third weight is a positive value.

6. The system of claim 1, wherein the first, second and third statistical measures are determined for a first time period.

7. The system of claim 6 wherein the first interaction data and the second interaction data are received in association with respective rendering times of the respective ones of the plurality of content items.

8. The system of claim 1, wherein the first interaction data represents at least one of an indication that one of the plurality of content items has been completely rendered and an indication that a user has liked one of the plurality of content items.

9. The system of claim 1, wherein the second interaction data represents at least one of an indication that a user dislikes one of the plurality of content items, a user has banned one of the plurality of content items from future play on one of the user devices, a user has skipped rendering one of the plurality of content items, and a user has changed stations during rendering one of the plurality of content items.

10. The system of claim 1 wherein the processor is further configured to send the plurality of content items to the plurality of user devices.

11. The system of claim 1 wherein the first interaction data further includes finishing information indicative of a number of times that the first content item was rendered in its entirety during the predetermined time period.

* * * * *